June 5, 1956     A. COLE     2,749,096
BEVERAGE DISPENSING APPARATUS
Filed Feb. 25, 1953     3 Sheets-Sheet 1
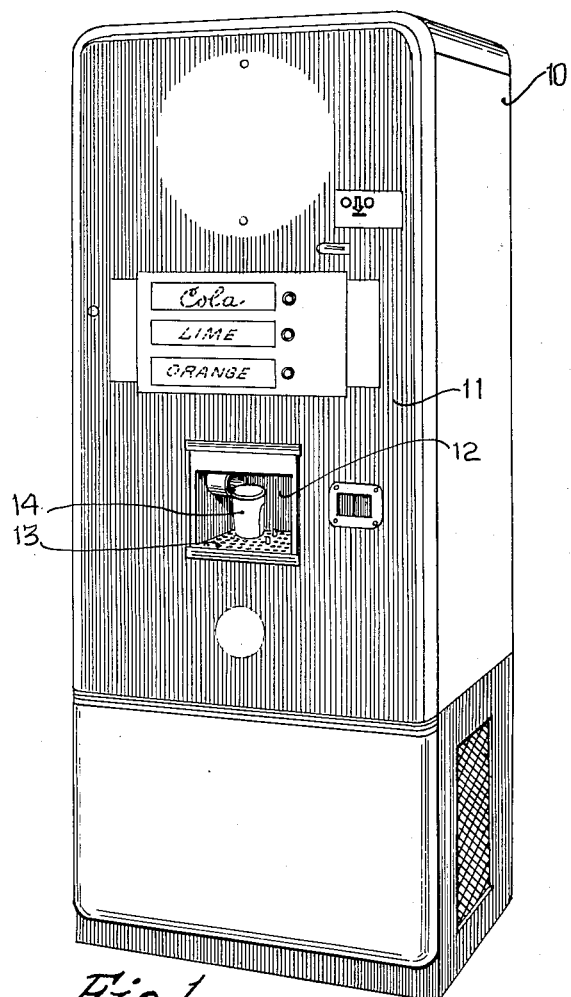
Fig. 1.
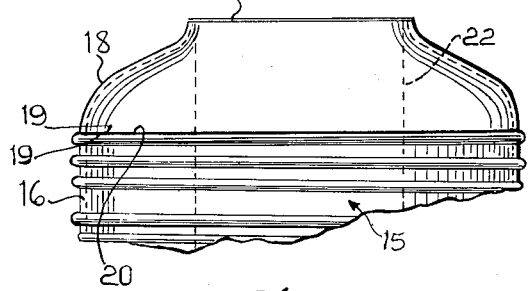
Fig. 3.
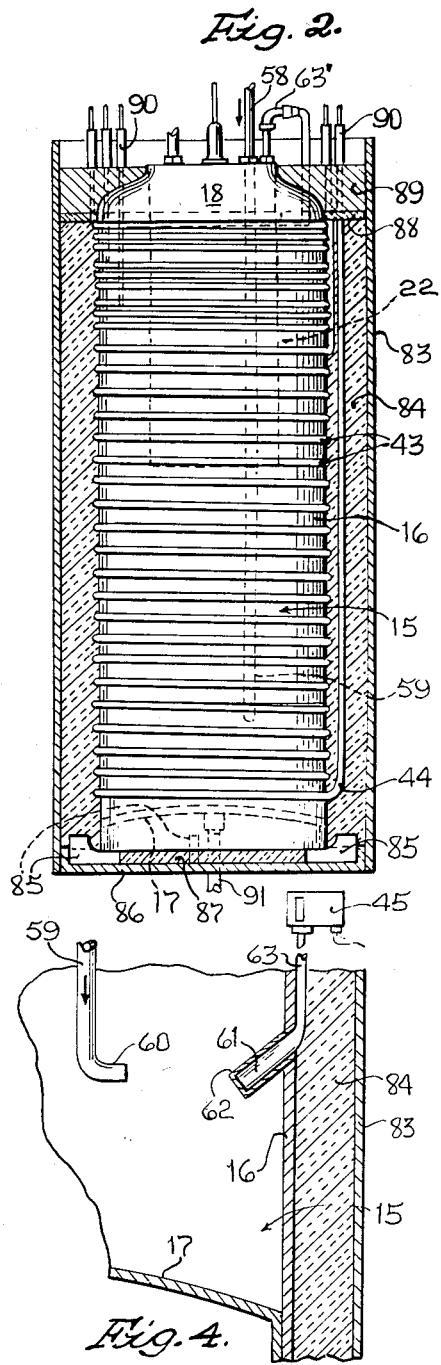
Fig. 2.
Fig. 4.
INVENTOR.
ALBERT COLE
BY Clarence E. Threedy
HIS ATTORNEY.

INVENTOR.
ALBERT COLE
BY Clarence E. Thready
HIS ATTORNEY.

United States Patent Office 2,749,096
Patented June 5, 1956

2,749,096

BEVERAGE DISPENSING APPARATUS

Albert Cole, Miami Beach, Fla.

Application February 25, 1953, Serial No. 338,784

3 Claims. (Cl. 257—241)

My invention summarily relates to a beverage dispensing apparatus from which one or more carbonated beverages is automatically dispensed upon deposit of a proper coin.

More particularly my invention has to do with that part of the apparatus which serves to maintain the carbonated drink at a palatable temperature. To this end it is an object to provide a novel, simple and inexpensive arrangement for accomplishing this function.

A still further object of the invention is to provide a drinking water supply tank which is hermetically sealed and enclosed within an insulated enclosure with flavored liquid and refrigerant coils thereabout, to preserve a predetermined and constant temperature best suited for the consumption of flavored beverages.

It is another object of the invention to provide in such apparatus a carbonated water container and flavored liquid or syrup coils, the container being mounted in a drinking water supply tank which is hermetically sealed and the coils being arranged in encircling relation with respect to the drinking water supply tank whereby the drinking water will serve the dual purpose of maintaining the carbonated water and the syrup at a palatable temperature.

A still further object of the invention is to provide a carbonated water container, a drinking water tank, flavored liquid or syrup coils embracing the drinking water tank, and refrigerating coils also embracing the drinking water tank, all arranged as a compact and convenient unit to be mounted and sealed, as such, within an insulated enclosure or shell.

Another object of the invention is to provide a temperature control in a refrigeration system whereby such refrigeration system will be operated instantaneously upon lowering of the drinking water temperature upon delivery of water to the drinking water tank.

Yet another and equally important object of the invention is to create the aforesaid temperature control within the drinking water tank in the region of delivery of water to such tank.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a beverage dispensing apparatus having incorporated therein my invention;

Fig. 2 is a vertical cross sectional detail view of an insulated container or enclosure showing the drinking water tank incorporated therein;

Fig. 3 is a fragmentary side elevational view of a cap portion of the drinking water tank embodied in my invention;

Fig. 4 is a fragmentary vertical sectional detail view of the lower portion of the drinking water tank;

Figure 5:
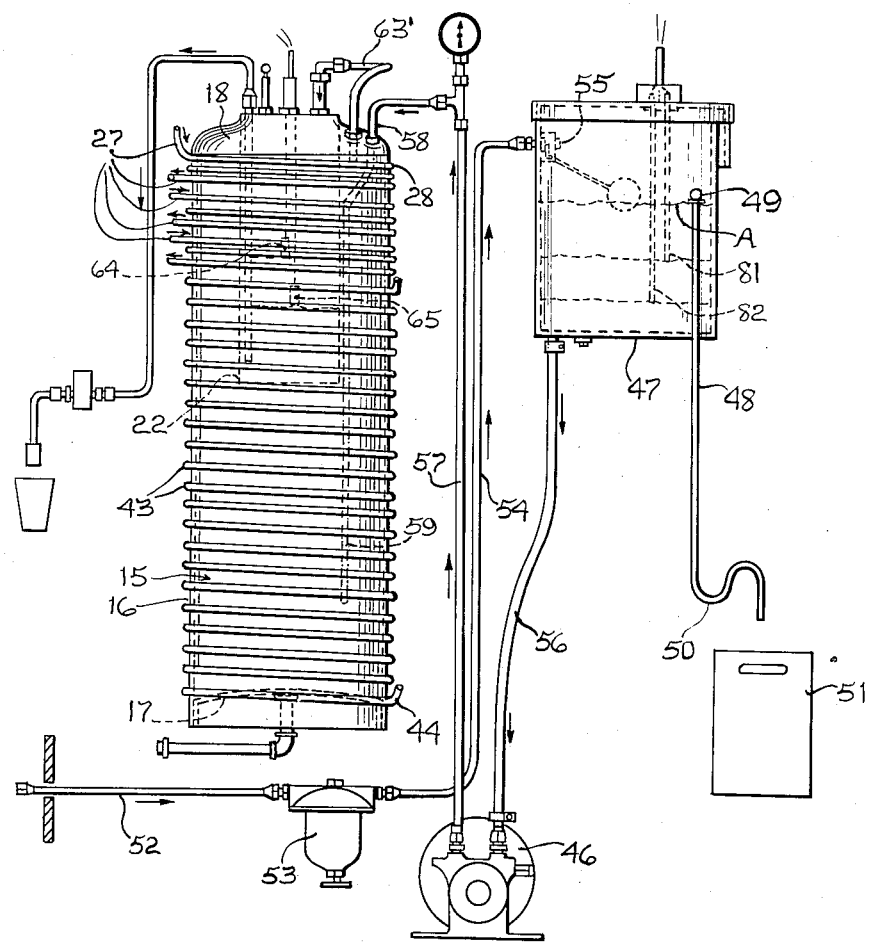
Fig. 5 is a schematic detail view of the water supply system embodied in my invention.

The conventional drink or beverage dispenser comprises a housing 10 within which is enclosed the activating parts of the dispenser. This housing may be of any approved construction and is preferably provided in its front wall 11 with a dispensing opening 12 having a drain plate 13 arranged therein for supporting a cup 14 into which the carbonated beverage is delivered. It is within such an enclosure that my invention is arranged.

As previously pointed out, my invention particularly relates to that part of the beverage dispenser apparatus which has to do with maintaining the carbonated drink at a palatable temperature. In this connection, I provide a drinking water tank 15 preferably comprising a tubular body 16 with its opposite end portions closed by a bottom wall 17 and a cap 18. The abutting edges 19 of the cap 18 and body 16 are welded together in a manner well known in the art and in a manner such as will seal the point of contact between these parts, such as indicated at 20. Likewise, the bottom wall 17 is welded to the body 16. The body 16 in its cap 18 is provided with a central opening 21 into which is pressfitted a carbonated water tank 22. The edges of this carbonated tank 22 at their point of contact with the cap 18 are welded together in a manner well known in the art and in a manner such as will seal the point of contact between these parts, such arrangement results in a drinking water tank which is hermetically sealed against leakage or the admission of foreign matter.

The carbonated water tank 22 is of a well-known construction and depends into the drinking water tank 15 from its support by the cap 18. Being submerged in the drinking water, the temperature of the carbonated water will be the same as that of the drinking water. Thus, by controlling the drinking water temperature, I am able to simultaneously control the temperature of the carbonated water, as well as the temperature of the flavored liquids or syrups.

In the housing 10 are arranged in a convenient manner and at convenient points of location, the required number of flavored liquid or syrup containers. In the present instance there are three of such containers indicated at 24, 25 and 26. Each container is intended to contain a liquid or syrup of a different flavor. The delivery conduits 27 of each of these containers have portions thereof coiled about and in direct contact with the drinking water tank 15 as at 28. The delivery ends of these conduits 27 each communicate with a solenoid dispensing valve 29 having a nozzle or lead pipe 30 disposed to deliver the flavored liquid or syrup to the drinking cup 14. These valves 29 are of a well-known construction and are schematically illustrated.

Also arranged in the housing 10 is a carbon dioxide ($CO_2$) cylinder 31 having associated therewith a conventional gauge 32 and tank regulator 33. A shut-off valve 34 is incorporated in a line 35 leading to a pressure regulator 36. This pressure regulator has communication with a coupling 37 which in turn communicates with the lines 38 each leading to one of the syrup tanks 24, 25, 26. Associated with this coupling 37 is a pressure gauge 39 and a release valve 40, the latter functioning to permit the escape of the gas from the tanks before the removal of their respective covers during replacement or refilling operations.

By the arrangement of embracing the supply lines 27 about the drinking water tank 15 and in contact therewith, the syrup or flavored liquid passing through these coils will be maintained at a palatable temperature due to the heat exchange effected by means of the temperature of the drinking water. Communicating with the line 35 adjacent the pressure regulator 36 is a pipe line 41 which has communication through a coupling 42 with the carbonated water tank 22.

Figures 6, 7:
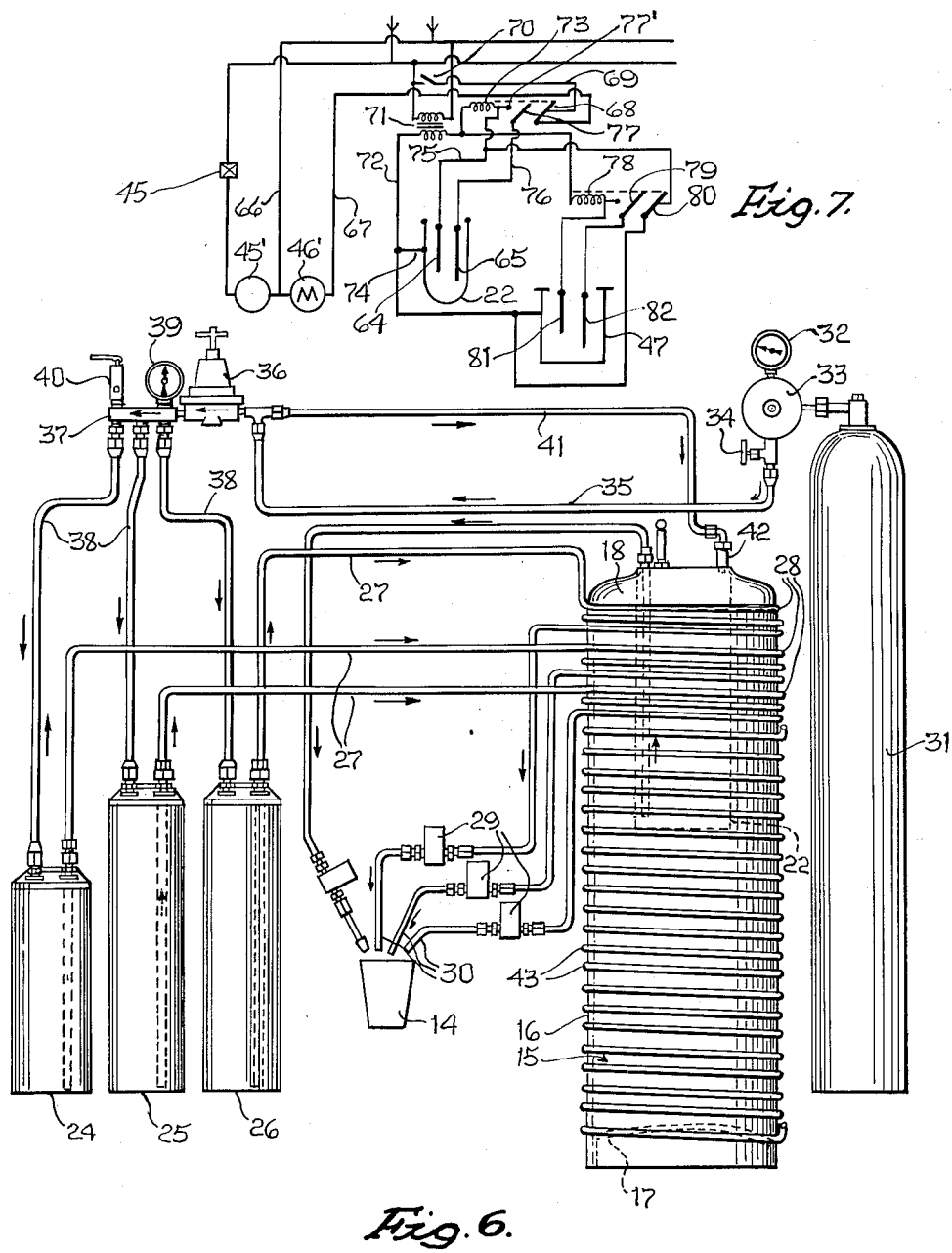
Fig. 6 is a schematic detail view of the syrup system embodied in my invention.
Fig. 7 is a view of a suggested electric circuit embodied in the invention.

Embracing the remaining portion of the drinking water tank 15 are the refrigeration coils 43 of the refrigeration line 44 of the conventional refrigerating system which includes a conventional compressor 45' and temperature control switch 45, schematically illustrated in Figs. 4 and 7.

Also arranged in the housing 10 is a water pump 46 and a water supply tank 47. Associated with the water tank 47 is an overflow pipe 48 which communicates with the tank 47 at a predetermined point such as indicated at 49. This pipe has a trap 50 formed in its lower end portion and empties into a removable drain bucket 51 likewise arranged within the housing 10.

A main water supply pipe is indicated at 52 and has connection with a suitable source of water supply. In this pipe is arranged a conventional filter 53. The filter 53 by a pipe line 54 communicates with the upper end portion of the tank 47 for delivery of water to the latter. Passage of the water into this tank 47 from the pipe line 54 is controlled by a suitable float valve 55. From the tank 47 the water through a pipe line 56 is delivered to the water pump 46 which pumps the water through a pipe line 57 into a pipe line 58 projected through the top of the cap 18 into the drinking water tank 15. The lower internal end 59 of this pipe 58 terminates short above the bottom 17 of the drinking water tank 15 and has an angled end portion 60 directed toward a thermo bulb 61 mounted in a socket 62 projecting into the tank 15 from a side wall thereof. This thermo bulb 61 includes a tube 63 which communicates with the temperature control switch 45.

This thermo bulb 61, which may be of any conventional type or design, is located within the tank 15 at the region where the water is admitted into the tank from the pipe 58. By such arrangement the thermo bulb 61 becomes activated to affect the temperature control switch 45 instantaneously with the admission of warm water into the drinking water tank from the end of pipe 58.

By such arrangement, I have found that the temperature of the drinking water within the tank 15 can be maintained at substantially a constant predetermined temperature. This results in a substantial saving of operation when it is considered that the refrigerating system is only momentarily operated to compensate for the rising temperature of the drinking water resulting from the admission of the warm water supply into the tank. Furthermore, by associating the discharge end of the water supply pipe directly in the region of location of the thermo bulb, the delay in operation of the refrigerating system is prevented which would normally be caused by the temperature exchange between the admitted water and the drinking water contained in the tank, were the outlet of the water supply pipe located remotely (for example, at the upper end of the tank) from the thermo bulb 61.

By the arrangement here described and illustrated, I have accomplished several objects over beverage dispensing apparatuses which have preceded my invention. In the first place, I have utilized the drinking water temperature to maintain the carbonated water at a temperature equivalent to the temperature of the drinking water. I have utilized the exchange of temperature between the flavored liquid or syrup coils and the drinking water to maintain the flavored liquid or syrup at a palatable temperature.

The drinking water from the tank 15 through a pipe line 63' is admitted into the carbonated water tank 22. To maintain a proper carbonated water supply in the tank 22, I have arranged a stop electrode 64 and a start electrode 65. The function of these electrodes is best understood by reference to the schematic electric diagram shown in Fig. 7.

In this circuit, one side of the motor 46' for the pump 46 by a conductor 66 is connected to one side of a power source. The other side of the motor by conductor 67 is connected to one side of a relay switch 68. The other side of this switch 68 by conductor 69 is connected to the other side of the power source. In such conductor 69 is arranged a switch 70.

In the circuit is arranged a transformer 71. One side of the secondary side of this transformer by a conductor 72 is connected to one side of a relay coil 73 and a suitable ground 74 which may be the carbonated water tank 22. The other side of the relay coil 73 by a conductor 75 is connected to the stop electrode 64. The start electrode 65 by a conductor 76 is connected to one side of the switch 77, the other side 77' of the switch 77 being connected to the relay coil 73. The arrangement is such that when the coil 73 is energized, the motor of the pump will be energized. When the stop electrode 64 is submerged in the carbonated water, the circuit between the transformer 71 and the relay coil 73 will be energized, thus to close the switch 77 and opening the switch 68 to deenergize the motor 46'. Such condition will remain until the water drops below and out of contact with the electrode 65. When this takes place, the relay coil 73 will be deenergized by the opening of the switch 77, and switch 68 will close to energize the motor 46' of the pump 46, the operation of which pump will replenish water into the carbonated water tank 22. Such pump will continue to operate until the water level contacts the stop electrode 64, at which time the relay coil 73 will become energized, closing the switch 77 and opening switch 68, the latter disrupting the power to the motor 46' of the pump 46.

A similar circuit is employed to control the supply of water to the tank 15. In this connection the circuit shown in Fig. 7 includes a relay coil 78 which actuates switches 79 and 80 similarly related to each other as are the switches 77 and 68 with respect ot electrodes 81 and 82.

The level of the water in the water supply tank 47 normally is approximately at the point A and is maintained at such level by means of the float valve 55. As long as the electrodes 81 and 82 are submerged in the water the switch 79 will be opened and the switch 80 closed and the pump motor 46' energized to effect operation of the pump 46 whenever the switches 68 and 77 are in the position shown in Fig. 7. However, should the water supply fail and the water in the supply tank 47 fall below the electrode 82, the switch 79 will be closed and the switch 80 opened to disrupt the power to the motor 46' to prevent operation of the pump 46 until the failure of the water supply to the tank 47 has been remedied. In this manner, the dispensing apparatus cannot operate whenever there is a failure in the supply of water to the tank 47.

As is apparent from the foregoing description read in connection with the drawings, the flavored liquid or syrup coils, the refrigeration coils, the carbonated water tank and the drinking water tank are assembled as a single unitary structure and, as such, is confined within an insulating enclosure. This enclosure includes a tubular shell 83 of a diameter such as provides a spacing between the drinking water tank 16 and the inside of the shell 83. In this spacing is confined a suitable insulation 84 firmly packed between the assembled structure and the shell 83. The bottom of the drinking water tank 15 rests upon suitable feet 85 carried by the bottom wall 86 of the shell 83. Between the bottom wall 86 and the bottom of the drinking water tank 15 is an insulating plate 87. Encircling the upper end portion of the drinking water tank 15 is an insulating disc 88 firmly fitted within the shell. Upon this disc 88 in encirclement with the cap 18 of the drinking water tank 15 is a sealing composition 89 preferably of a tar formation. The several flavored liquid or syrup lines which pass through the insulating disc 88 and seal 89 have portions exterior thereof enclosed within the insulating sleeves 90 of any approved type and construction.

To complete the invention, the bottom wall of the drinking water tank 15 carries a suitable drain pipe 91 which has incorporated therein a suitable shut-off valve (not shown).

From the foregoing description, it is apparent that I provide a drinking water tank which is hermetically sealed and one in which the temperature of the drinking water is utilized by conduction to maintain the carbonated water and flavored liquid or syrup coils at a proper temperature. The specific relationship between the several parts of the invention provides a compact unit which utilizes the minimum of space when arranged within the housing 10.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination, a beverage dispenser comprising a dispensing system having a drinking water tank, a semi-conically shaped cap for said tank having formed therein a central opening, a carbonated water tank carried in said opening of said cap and submerged in the drinking water contained in said drinking water tank, said cap and said tank forming a seal between that portion of the drinking water tank supporting said carbonated water tank and said latter tank, an enclosure for said drinking water tank, and an insulation within said enclosure and embracing said drinking water tank, an insulating disc frictionally arranged at the upper end portion of the shell and embracing the upper end portion of said drinking water tank at its junction with said cap, a sealing material placed on said disc and covering the semi-conically shaped walls of said cap to its point of connection with said carbonated water tank to seal said drinking water tank within said shell, and means for delivering water from the top of said drinking water tank to the top of said carbonated water tank.

2. In combination, a tubular shell, a cover for closing one end of said tubular shell, a drinking water tank having a semi-conically shaped cap arranged in the shell in spaced relation with respect to the side walls thereof, a carbonated water tank carried by said cap and adapted to cooperate therewith to hermetically seal said water tank, coil elements embracing said tank, an insulation arranged between said tank and said shell, an insulating plate at the bottom of said shell beneath said tank, an insulating disc frictionally arranged at the upper end portion of the shell and embracing the upper end portion of said tank at its junction with its cap, and a sealing material placed on said disc and covering the semi-conically shaped walls of said cap to seal said tank within said shell.

3. In combination, a tubular shell, a drinking water tank having a semi-conically shaped cap arranged in the shell in spaced relation with respect to the side walls thereof, said cap provided with a central opening in which a carbonated water tank is supported to hermetically seal said drinking water tank, coil elements embracing said drinking water tank, an insulation arranged between said latter tank and said shell, an insulating plate on the bottom of said shell beneath said drinking water tank, an insulating disc frictionally arranged at the upper end portion of the shell and embracing the upper end portion of said drinking water tank at its junction with said cap, and a sealing material placed on said disc and covering the semi-conically shaped walls of said cap to its point of connection with said carbonated water tank to seal said drinking water tank within said shell.

References Cited in the file of this patent

UNITED STATES PATENTS

| | | |
|---|---|---|
| 2,128,794 | Billings | Aug. 30, 1938 |
| 2,381,013 | Tanner | Aug. 7, 1945 |
| 2,391,003 | Bowman | Dec. 18, 1945 |
| 2,433,977 | Bently | Jan. 6, 1948 |
| 2,434,374 | Tull | Jan. 13, 1948 |
| 2,435,774 | DiPietro | Feb. 10, 1948 |
| 2,496,466 | Graham | Feb. 7, 1950 |
| 2,498,524 | Booth | Feb. 21, 1950 |
| 2,612,357 | Parks | Sept. 30, 1952 |